(12) United States Patent
Chaudhary et al.

(10) Patent No.: US 11,551,272 B2
(45) Date of Patent: Jan. 10, 2023

(54) USING TRANSACTION DATA TO PREDICT VEHICLE DEPRECIATION AND PRESENT VALUE

(71) Applicant: Capital One Services, LLC, McLean, VA (US)

(72) Inventors: Viraj Chaudhary, Newark, NJ (US); Cruz Vargas, Alexandria, VA (US); Jennifer Kwok, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/841,825

(22) Filed: Apr. 7, 2020

(65) Prior Publication Data

US 2021/0312511 A1    Oct. 7, 2021

(51) Int. Cl.
  *G06Q 30/02* (2012.01)
  *G06Q 40/02* (2012.01)
  *G06N 20/00* (2019.01)

(52) U.S. Cl.
  CPC ......... *G06Q 30/0283* (2013.01); *G06N 20/00* (2019.01); *G06Q 30/0278* (2013.01); *G06Q 40/025* (2013.01)

(58) Field of Classification Search
  CPC ........... G06Q 30/0283; G06Q 30/0278; G06Q 40/025; G06N 20/00
  USPC ........................................................ 705/306
  See application file for complete search history.

(56) References Cited

U.S. PATENT DOCUMENTS

| | | | |
|---|---|---|---|
| 9,336,494 B1* | 5/2016 | Purpura | G06N 20/00 |
| 2005/0075829 A1* | 4/2005 | Polimadei | G01C 22/02 |
| | | | 702/165 |
| 2007/0143195 A1* | 6/2007 | Bell | G06Q 30/06 |
| | | | 705/35 |
| 2011/0099063 A1* | 4/2011 | Clemmons | G06Q 30/0251 |
| | | | 705/14.49 |
| 2015/0058187 A1* | 2/2015 | Howe | G06Q 30/0284 |
| | | | 705/31 |
| 2015/0254719 A1* | 9/2015 | Barfield, Jr. | G06Q 30/0261 |
| | | | 701/31.5 |

(Continued)

FOREIGN PATENT DOCUMENTS

| | | | | |
|---|---|---|---|---|
| WO | WO-2017142536 A1 * | 8/2017 | | G06Q 30/06 |
| WO | 2018136536 A1 | 7/2018 | | |

OTHER PUBLICATIONS

Carbrain.com, "We Buy Totaled Cars Near Me," [online], archived on: May 24, 2019, available at: < https://web.archive.org/web/20190524205049/https://carbrain.com/sell-your-totaled-car > (Year: 2019).*

(Continued)

*Primary Examiner* — Richard W. Crandall
(74) *Attorney, Agent, or Firm* — KDB

(57) ABSTRACT

Various embodiments are directed to a system or platform with machine learning capabilities configured to accurately predict in real-time a depreciation factor of a vehicle associated with a customer and further accurately predict a present value of the vehicle based at least in part on card transaction data associated with the customer. Based on one or more factors, such as a determination that the present value of the vehicle falls below a predefined threshold value, one or more auto financing products may be generated and provided to the customer by the system.

20 Claims, 8 Drawing Sheets

(56) References Cited

U.S. PATENT DOCUMENTS

| | | | |
|---|---|---|---|
| 2016/0267588 A1* | 9/2016 | Cain | G06Q 40/025 |
| 2016/0350726 A1* | 12/2016 | Lee | G06Q 10/20 |
| 2018/0018338 A1* | 1/2018 | Guzman | G06F 16/30 |
| 2018/0204253 A1* | 7/2018 | Painter | G06F 40/205 |
| 2018/0204281 A1 | 7/2018 | Painter et al. | |
| 2018/0204282 A1 | 7/2018 | Painter et al. | |
| 2019/0370896 A1* | 12/2019 | Scopazzi | G06Q 40/025 |
| 2019/0378180 A1* | 12/2019 | Endras | G06Q 30/0283 |

OTHER PUBLICATIONS

Gasoline Vehicles: Learn More About the Label, [online], archived on Jan. 2, 2018, archived at: < https://web.archive.org/web/20180102133841/https://www.fueleconomy.gov/feg/label/learn-more-gasoline-label.shtml > (Year: 2018).*

Brokerlink.ca, "How do you find out your annual mileage?" [online], published on May 17, 2016, available at: < https://www.brokerlink.ca/blog/how-do-you-calculate-mileage > (Year: 2016).*

"Deep Learning Model for Car Price Prediction using TensorFlow," [online] published on Feb. 4, 2018, available at: < https://androidkt.com/car-price-prediction/ > (Year: 2018).*

* cited by examiner

MONTHLY CREDIT CARD STATEMENT

JOHN DOE  
*1234 MAIN ST.*  
*CITY, STATE 54321*

*CREDIT LIMIT:*    *$10,000*  
*BALANCE:*    *$153.26*  
*CASH LIMIT:*    *$5,000*

*EXPENSE BREAKDOWN FROM 01/13/2020 TO 02/12/2020:*

| Date – Description | Amount |
|---|---|
| 01/13/2020 – Gas Station #456 | $35.56 |
| 01/13/2020 – Fast Food Chain | $5.78 |
| 01/13/2020 – Donut Shop | $8.98 |
| 01/15/2020 – Restaurant | $46.55 |
| . . . | |
| 01/21/2020 – Gas Station #571 | $32.62 |
| 01/22/2020 – Online Video Subscription | $12.99 |
| 01/24/2020 – Coffee Shop | $7.80 |
| . . . | |
| 01/28/2020 – Gas Station #571 | $33.50 |
| . . . | |
| 02/06/2020 – Gas Station #456 | $31.28 |

CALCULATION OF MILES DRIVEN 400

*MPG*: 23 city / 34 highway
*AVERAGE MPG*: 28.5
*GAS PRICE*:
    REGULAR @ #456 ON 1/13 = $2.85 PER GALLON
    REGULAR @ #571 ON 1/21 = $2.80 PER GALLON
    REGULAR @ #571 ON 1/28 = $2.74 PER GALLON
    REGULAR @ #456 ON 2/6 = $2.88 PER GALLON

*MILES DRIVEN FROM 1/13 TO 1/21*:
$35.56 / $2.85 = 12.477 GALLONS
12.477 X 28.5 MPG = 355.600 MILES

*MILES DRIVEN FROM 1/21 TO 1/28*:
$32.62 / $2.80 = 11.65 GALLONS
11.65 X 28.5 MPG = 332.025 MILES

*MILES DRIVEN FROM 1/28 TO 2/6*:
$33.50 / $2.74 = 12.226 GALLONS
12.226 X 28.5 MPG = 348.449 MILES

*MILES DRIVEN FROM 2/6 TO SUBSEQUENT FILL-UP*:
$31.28 / $2.88 = 10.861 GALLONS
10.861 X 28.5 MPG = 309.542 MILES

*TOTAL MILES DRIVEN IN MONTH* = 1,345.616 MILES

```
┌─────────────────────────────────────────────┐
│ RECEIVE CUSTOMER TRANSACTION DATA AND       │
│ DETERMINE WHICH OF THE PLURALITY OF EXPENSES│
│ IN THE DATA ARE FUEL EXPENSES               │
│ 602                                         │
└─────────────────────────────────────────────┘
                      │
┌─────────────────────────────────────────────┐
│ DETERMINE MAKE/MODEL/YEAR OF VEHICLE, DETERMINE│
│ FUEL CONSUMPTION INFORMATION, AND DETERMINE COST│
│ CORRESPONDING TO EACH FUEL EXPENSE          │
│ 604                                         │
└─────────────────────────────────────────────┘
                      │
┌─────────────────────────────────────────────┐
│ DETERMINE A PREDICTED NUMBER OF             │
│ MILES DRIVEN ON THE VEHICLE                 │
│ 606                                         │
└─────────────────────────────────────────────┘
                      │
┌─────────────────────────────────────────────┐
│ DETERMINE A DEPRECIATION FACTOR             │
│ ASSOCIATED WITH THE VEHICLE                 │
│ 608                                         │
└─────────────────────────────────────────────┘
                      │
┌─────────────────────────────────────────────┐
│ DETERMINE A PRESENT VALUE OF THE VEHICLE    │
│ 610                                         │
└─────────────────────────────────────────────┘
```

*FIG. 6*

USING TRANSACTION DATA TO PREDICT VEHICLE DEPRECIATION AND PRESENT VALUE

BACKGROUND

A financial institution (e.g., bank) may have an automobile financing arm that may provide various automobile financing (hereinafter "auto financing") products to customers. For example, an auto loan for a predetermined amount at a predetermined rate may be provided to a qualified customer. In another example, refinancing on an existing loan may be offered to the customer.

Besides what type of vehicle a customer purchased, when, and for how much, the auto financing arm of the financial institution typically does not know or retain more information about the vehicle. In at least that regard, the auto financing arm has no way of knowing whether the customer might be in the market for a new vehicle at some point in time or how much the vehicle is presently worth.

SUMMARY

Various embodiments are generally directed to a system or platform with machine learning capabilities configured to accurately predict in real-time a depreciation factor of a vehicle associated with a customer and further accurately predict a present value of the vehicle based at least in part on card transaction data associated with the customer. Based on one or more factors, such as a determination that the present value of the vehicle falls below a predefined threshold value, one or more auto financing products may be generated and provided to the customer by the system.

BRIEF DESCRIPTION OF THE DRAWINGS

FIG. 3 illustrates an example card statement in accordance with one or more embodiments.

FIG. 4 illustrates an example calculation of miles driven in accordance with one or more embodiments.

FIG. 6 illustrates an example flow diagram in accordance with one or more embodiments.

DETAILED DESCRIPTION

Figure 1:
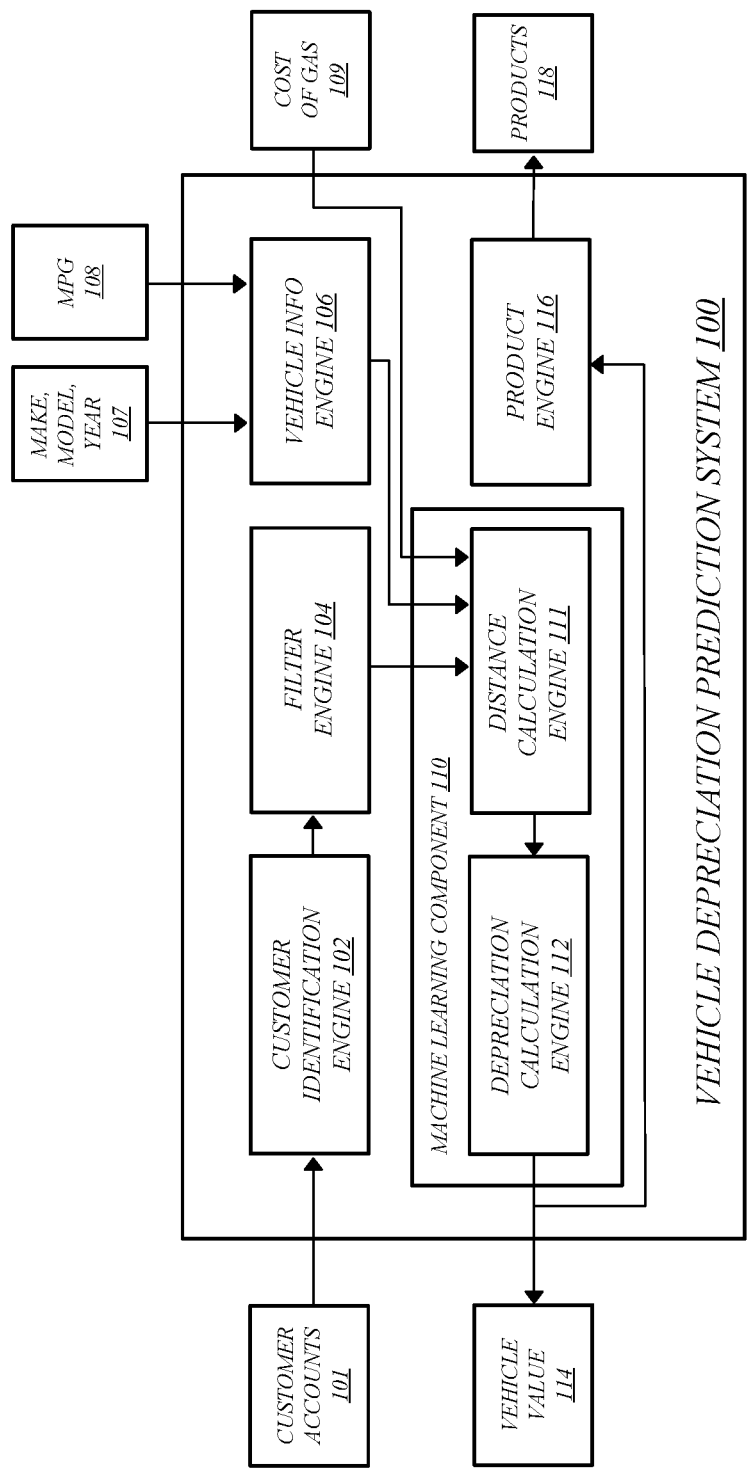
FIG. 1 illustrates an vehicle depreciation prediction system in accordance with one or more embodiments.

Various embodiments are generally directed to a system or platform with machine learning capabilities configured to accurately predict in real-time a depreciation factor of a vehicle belonging to a customer and, thus, accurately predict a present value of the vehicle based at least in part on card transaction data associated with the customer.

In examples, the system may be configured to identify a customer that has both a card account (e.g., credit card, debit card, charge card, virtual card, etc.) and an auto financing account. For that customer, card transaction data may be analyzed to identify fuel station (e.g., gas, diesel) expenses.

Along with information related to the make/model/year of the vehicle, the average miles per gallon (MPG) corresponding to the vehicle, and cost of gas on the days corresponding to the gas station expenses at the respective gas stations, the system can accurately determine or predict a number of miles the vehicle has driven within a predefined time frame (e.g., miles driven per year, miles driven per month).

Based on the miles-driven calculation, the system may then accurately determine a depreciation factor (e.g., $0.25 per driven mile, $0.50 per driven mile) and also accurately determine the present value of the vehicle. The machine learning component of the system (e.g., a machine learning model) may not only perform one or more of the aforementioned calculations, determinations, predictions, etc. but may intelligently keep track of and adjust various variables associated with the vehicle depreciation and present value calculations. For example, as will be further described below, the system may set the first calculated depreciation factor a "default" depreciation factor, and each time the vehicle is sold or involved in a particular transaction, the machine learning component of the system may adjust or update the factor based on newly acquired data associated with the sale or transaction (e.g., estimated sale value versus actual sale value).

In further examples, upon predicting or determining an accurate depreciation factor and a present value for the vehicle, the system may also determine whether the customer qualifies or whether it is timely to present to the customer any vehicle financing products (e.g., a loan or financing offer for a new vehicle, refinancing offer) based on the present value of the vehicle. If the customer qualifies or if the system determines that it is timely (e.g., the vehicle has reached a threshold age or mileage), the system may generate and provide the one or more products to the customer via one or more channels (e.g., e-mail, text message, application notification message).

Previously, it was extremely difficult, or even impossible, for an auto financing department of a financial institution to know, derive, or obtain accurate vehicle-related information associated with a customer, such as its present value, without customer input. The embodiments and examples described herein overcome the above problems and are advantageous over the previous solutions in that a current value of a vehicle can be accurately predicted in real-time or near real-time and without input by the customer by analyzing customer transaction data and calculating a depreciation factor associated with the vehicle. Another advantage of the embodiments and examples described herein, for example, is that a machine learning component can continually adjust the variables used to determine vehicle depreciation factor based on real-world data and further training of the machine learning component. In at least that regard, the machine learning component allows the system to constantly learn and evolve to better and more accurately predict vehicle depreciation and value over a period of time.

Reference is now made to the drawings, where like reference numerals are used to refer to like elements. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example vehicle deprecation prediction system 100 according to one or more embodiments. As will be further discussed below, one or more computing devices (e.g., server computers, laptops, smartphones, tablet computers, etc.), and/or processing circuitries thereof, may be operable to execute instructions that execute, run, and/or provide support to the system 100 and the various components therein. As shown, the vehicle depreciation prediction system 100 may include at least a customer identification engine 102, a filter engine 104, a vehicle information engine 106, a machine learning component 110, which may include at least a distance calculation engine 111 and a depreciation calculation engine 112, and a product engine 116, each of which will be further described below.

In examples, customer accounts and information associated therewith may be input to or received by the customer identification engine 102. In some examples, the customer identification engine 102 may continually observe and analyze the customer accounts. In one embodiment, the customer identification engine 102 may identify or determine all customers that have both at least one card account (e.g., credit card, debit card, charge card, virtual card) and at least one vehicle financing account (e.g., account associated with a vehicle loan). To that end, the system 100 may be able to at least identify a specific set of target customers—e.g., customers that are both card and auto-financing customers.

Upon identifying at least one customer that has both a card account and a vehicle financing account, transaction data from the card account may be input to (or received or accessed by) the filter engine 104 for identifying or filtering out specific transactions that signify or indicate a gas station expense. For example, gas station expenses may be determined by way of merchant category codes (MCCs). In another example, a text-based search or an optical character recognition (OCR) procedure may be performed on the card transactions to determine gas station expenses. In yet a further example, the machine learning component 110, which may be a machine learning model, may be utilized to analyze which of the transactions are gas station expenses. It may be understood that transaction patterns (e.g., recurrence of specific values or amounts at specific times) may also indicate gas expenses. It may further be understood that the filter engine 104 or other components of the system 100 may have mechanisms to subtract any non-gas related expenses that may be incurred at gas stations, such as food or snack purchases.

As further shown in FIG. 1, gas expenses filtered or identified by the filter engine 104 may be input to (or received or accessed by) the distance calculation engine 111 of the machine learning component 110. Moreover, information associated with the customer's vehicle from the vehicle information engine 106 may be input to (or received or accessed by) the distance calculation engine 111. In examples, the vehicle information engine 106 may determine or identify the exact vehicle (e.g., make/model/year 107) that the customer has purchased or financed, for instance, based at least on internal or external databases or customer account transaction data (e.g., if the customer purchased the vehicle via a customer account, such as checking, credit, savings). In further examples, the vehicle information engine 106 may obtain or access MPG-related information associated with the make/model/year 107 of the vehicle, which may be passed on to the distance calculation engine 111. It may be understood that information related to make/model/year 107 of the vehicle and MPG 108 may be provided by or originate from external or third-party sources.

The vehicle depreciation prediction system 100 may also determine and/or obtain the exact gas prices corresponding to the specific dates and gas stations of the respective gas station expenses determined by the filter engine 104. As will be further described below, the gas prices along with the MPG information associated with the make/model/year of the vehicle may be used to calculate the miles driven on the vehicle, and thus, the depreciation factor and/or the present value of the vehicle. It may also be understood that the gas prices for the various days and locations associated with the gas station expenses may be provided by external or third-party sources.

As illustrated, the distance calculation engine 111 of the machine learning component 110 may receive at least the gas expenses from the filter engine 104, the MPG 108 from the vehicle information engine 106, and cost of gas 109. Using this information, the distance calculation engine 111 may determine a number of miles that were driven on the vehicle for a predetermined or predefined period of time (e.g., miles per year, miles per month, miles per week). It may be understood that the distance calculation may be, in some instance, limited to real, ascertainable transaction data available in the customer's card statements. In other instances, the distance calculations may be projections or estimations based on the calculations from the ascertainable data.

The calculated number of miles driven on the vehicle may be provided to the depreciation calculation engine 112, which may determine a depreciation factor associated with the vehicle based on the calculated usage rate. For example, the depreciation calculation engine 112 may determine that the depreciation factor is twenty-five cents per driven mile (e.g., the vehicle depreciates by $0.25 for every mile driven). It may be understood that the depreciation factor is dynamic and may change based on the usage rate of the vehicle and/or changing market value of the vehicle. As will be further described below, the machine learning component 110 may adjust depreciation factor calculations based on real-world data it receives when a vehicle transaction event occurs, such as the vehicle being sold, traded, etc.

Thereafter, the vehicle depreciation factor may be used to accurately predict a present value of the vehicle 114, which may be output by the system 100 and/or input to a product engine 116. As shown and as will be further described below, the product engine 116 may determine that, based on the vehicle value 114, the customer is in the market for a new vehicle, refinancing, or the like. For example, the product engine 116 of the system 100 may determine that vehicle value 114 has dropped below a predetermined threshold value, which may trigger the engine 116 to generate and output certain products 118 to the customer. In embodiments, the products 118 may be advertising products, such as a financing offer (e.g., new loan, new financing) so that the customer can purchase a new vehicle. As will be further described below, the products 118 may be delivered via one or more channels, e.g., e-mail, text message, app notification message, website banner advertisement, etc.

It may be understood that the system 100 and the components therein are arranged in the manner depicted for illustrative purposes. Accordingly, the arrangement of the components of the system 100 is not limited to any particular manner. For example, the machine learning component 110 may encompass more than just the distance calculation engine 111 and the depreciation calculation engine 112, and in some examples, the machine learning component 110 may be integrated into the entire system 100 and the other components thereof.

Figure 2:
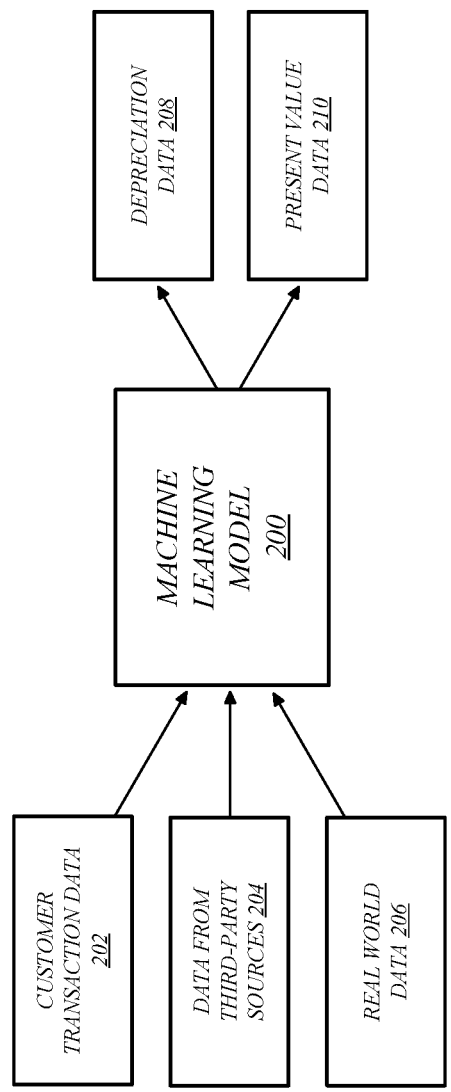
FIG. 2 illustrates an example machine learning model in accordance with one or more embodiments.

FIG. 2 illustrates an example machine learning model 200 and training thereof according to one or more embodiments. The machine learning model 200 may be implemented as the machine learning component 110 of FIG. 1, as described above. It may be understood that the machine learning model 200 may be any type of learning algorithm, such as a supervised learning algorithm, an unsupervised learning algorithm, reinforcement learning algorithm, and may include at least a linear regression model, logistic regression model, a decision tree model, a support vector machine (SVM) model, a Naive Bayes model, a k-nearest neighbors (kNN) model, k-means model, a random forest model, a dimensionality reduction algorithm, a gradient boosting algorithm, an XGBoost algorithm, a LightGBM algorithm a Catboost model, etc. The machine learning model 200 may also encompass classification models, one or more of which may be based on a convolutional neural network (CNN) algorithm, a recurrent neural network (RNN) algorithm, a hierarchical attention network (HAN) algorithm, or the like.

As shown, the machine learning model 200 may be trained using one or more training data sets or batches that include at least three different data types. For example, a first data type may be customer transaction data 202. In another example, a second data type may be data from third-party sources 204. In yet another example, a third data type may be real-world data 206.

The customer transaction data 202 may include any data associated with card-based transactions, such as credit card transactions, debit card transactions, charge card transactions, virtual card transactions, and the like. Moreover, the customer transaction data 202 may include various types of transactional information (e.g., MCC or any other types of terms, descriptors, identifiers, numbers) as normally found, for instance, on a card statement. In the transaction data 202, gas-related expenses may be flagged for training the machine learning model 200. The expenses may be flagged based on certain MCCs, certain descriptors, etc. In at least that regard, the model 200 may be configured to receive a customer transaction data set and accurately determine which transactions are gas expenses.

In embodiments, data 204 from third-party sources may include various types of information related to vehicles, such as the make, model, and year corresponding to the vehicles, MPG information with respect to those vehicles, vehicle values set by third-party industry guides. Moreover, the third-party data 204 may also include cost of gas for varying octane levels and cost of diesel corresponding to predefined time periods and/or specific dates. The machine learning model 200 may be trained to recognize one or more portions of the third-party data 204 as important pieces of information in calculating and predicting at least a depreciation factor and a present value of the vehicle.

In further embodiments, the real-world data 206 may include information relating to real transactional events associated with the vehicle, such as the sale of the vehicle (e.g., actual price sold), parties involved in the sale, a trade-in event, etc. The real-world data 206 may be used by the machine learning model 200 to intelligently adjust depreciation and present-value calculations based on the real-life transactions. In at least that way, the actual sale price of the vehicle, for example, can be compared to the predicted value and, based on this comparison, the depreciation factor or the present value calculations can be automatically adjusted by the model 200. For purposes of training the machine learning model 200, the real-world data 206 may be simulated and flagged so that the model 200 can learn how to adjust or modify such calculations.

As shown in FIG. 2, the output of the machine learning model 200 may be at least depreciation data 208 and present value data 210, which may be used to generate one or more auto financing products, as described above with respect to the product engine 116 of FIG. 1. It may be understood that training the machine learning model 200 may broadly involve at least learning (e.g., determining) good values for all the weights and the bias from labeled examples and the broader goal of training the model may be to find a set of weights and biases that result in low loss (e.g., penalty for a bad prediction), on average, across all examples. For instance, in supervised learning, a machine learning algorithm may build a model by examining many examples and attempting to find a model that minimizes loss.

FIG. 3 illustrates an example card statement 300 according to one or more embodiments. In examples, transaction data from the card statement 300 may be analyzed, for example, by the filter engine 104 of the vehicle depreciation prediction system 100 described above, to identify or filter out any gas expenses to be used for the vehicle depreciation and value predictions. In examples, the card statement 300 may be a monthly credit card statement for customer, John Doe, containing all credit card expenses from Jan. 13, 2020 to Feb. 12, 2020.

As shown, out of all the expenses occurred during the month, which includes, among other expenses, food and entertainment expenses, four separate gas station expenses can be identified: an expense of $35.56 on January 13 at Gas Station #456, an expense of $32.62 on January 21 at Gas Station #571, an expense of $33.50 on January 28 at Gas Station #571, and an expense of $31.28 on February 6 at Gas Station #456.

As described above, the identification of the gas station expenses can be based on various factors, e.g., identifying MCCs associated with the transaction, text-based analysis (identifying words like "gas" or "station"), transactional pattern analysis (gas expenses occur every seven days or so). Upon identifying or filtering out all gas-related expenses from the transaction data in the card statement 300, an approximate number of miles driven on the vehicle within that time period (January 13 to February 12) may be calculated, which will be further described below.

FIG. 4 illustrates an example calculation 400 of miles driven on a vehicle based on transaction data from card statement 300 according to one or more embodiments. For the calculation 400, information relating to average MPG of the vehicle and gas prices on the dates corresponding to the gas expenses may be obtained or provided, for example, by external or third-party sources, as described above.

As shown, the vehicle may get 23 miles per gallon in the city and 34 miles per gallon on the highway. In examples, the two MPGs may be averaged to get 28.5 miles to the gallon. Further shown in FIG. 4 are the gas prices on the days gas was purchased. For instance, regular gas at the #456 station on January 13 was $2.85 per gallon. In another instance, regular gas at the #571 station on January 21 was $2.80 per gallon. In a yet another instance, regular gas at the #571 station on January 28 was $2.74 per gallon. And in a further instance, regular gas at the #456 station on February 6 was $2.88 per gallon. It may be understood that the octane recommendation corresponding to the make, model, and year of the vehicle be used at least for determining the gas prices.

Accordingly, based on the above information and the gas expenses derived from the card statement 300, the number of miles driven on the vehicle may be calculated for approximately each week of the month. For the distance calculation from January 13 to January 21, the gas expense of $35.56 on January 13 can be divided by $2.85 (price of regular gas at the #456 station on January 13) to get 12.477 gallons, which can be multiplied by the average MPG of 28.5 to get 355.6 miles (e.g., miles driven from date of fill-up on January 13 to date of next fill-up on January 21).

For the distance calculation from January 21 to January 28, the gas expense of $32.62 on January 21 can be divided by $2.80 (price of regular gas at the #571 station on January 21) to get 11.65 gallons, which can be multiplied by the average MPG of 28.5 to get 332.025 miles (e.g., miles driven from date of fill-up on January 21 to date of next fill-up on January 28).

Similarly, for the distance calculation from January 28 to February 6, the gas expense of $33.50 on January 28 can be divided by $2.74 (price of regular gas at the #571 station on January 28) to get 12.226 gallons, which can be multiplied by the average MPG of 28.5 to get 348.449 miles (e.g., miles driven from date of fill-up on January 28 to date of next fill-up on February 6).

For the distance calculation from February 6 to date of next fill-up, the gas expense of $31.28 on February 6 can be divided by $2.88 (price of regular gas at the #456 station on February 6) to get 10.861 gallons, which can be multiplied by the average MPG of 28.5 to get 309.452 miles (e.g., miles driven from date of fill-up on February 6 to date of next fill-up).

Adding the calculated distances for each week, it can be estimated that approximately 1,345.616 miles were driven on the vehicle during the relevant month. According to embodiments, similar calculations may be performed for subsequent months to obtain the total distance driven for a whole year. Moreover, if possible, distance calculations can be conducted any time period with available transaction data so as to better predict total distance driven. It may be understood that when customer transaction data is unavailable for certain periods of time or the customer has had the card for a short period of time, distance calculations for a given month may be used to make year-based projections.

In FIG. 4, for instance, if the monthly credit card statement 300 was all the real transaction data that was available for the user, a vehicle depreciation prediction system may project that the customer may drive, on average, approximately 16,147.392 miles on the vehicle per year. Based at least in part on this calculation, the prediction system may dynamically determine in real-time a specific depreciation factor for the vehicle (e.g., $0.25 per driven mile, which equates to depreciation of $4,036.85 per year). For example, depreciation information found in third-party industry price guides may be used to determine the depreciation factor. Thus, if more miles are drive on the vehicle, the depreciation factor may increase.

Using the depreciation factor, a present value of the vehicle may be accurately predicted by the system, which would otherwise be unknown or unascertainable without direct input from the customer (which, even then, could be inaccurate or unreliable). As described above, the distance, depreciation, and present-value calculations or predictions can all be handled or performed by a machine learning component of the system. The machine learning component may continually learn and adjust predictions based on new information about the vehicle, such as an actual sale value of the vehicle versus the predicted value, etc. Based on these adjustments, the machine learning model may dynamically and in real-time continually maintain an accurate depreciation factor, and thus, an accurate present value.

Figure 5:
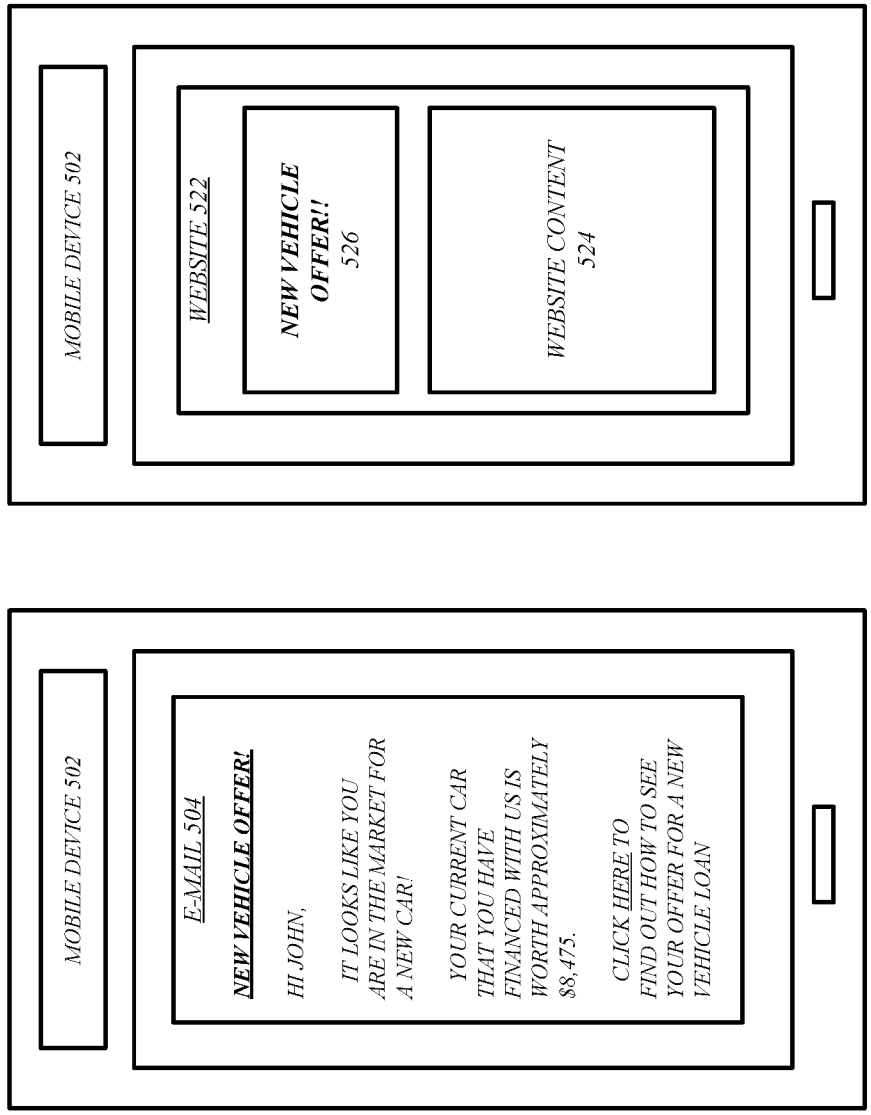
FIG. 5 illustrate example products in accordance with one or more embodiments.

FIG. 5 illustrates at least two different auto financing products 500 according to one or more embodiments. If a predicted present value of a vehicle, for instance, meets one or more predefined thresholds (e.g., threshold price of $7,500 or below), various auto financing products (e.g., new loan offer, refinancing offer, trade-in offer, etc.) may be offered to the customer via different channels (e.g., e-mail, text message, app notification). As shown, an offer for financing a new vehicle may be presented to the customer in at least two ways.

In embodiments, an e-mail 504 may be displayed on mobile device 502, e.g., smartphone belonging to the customer. The e-mail 504 may include a "new vehicle offer" along with a hyperlink that directs the customer to the offer. Moreover, the e-mail 504 may include various details relating to the vehicle, such as the present value of the vehicle and that it appears the customer may be in the market for a new vehicle.

In another example, the mobile device 502 may display a website 522, which may contain at least website content 524. As illustrated, the new vehicle offer 526 may be presented in the form of a banner advertisement arranged at the top of the website 522. Similar to the above described hyperlink, the customer may be directed to the new vehicle offer 526 by touching the banner ad.

FIG. 6 illustrates a flow diagram 600 in accordance with one or more embodiments. The flow diagram 600 is related to the prediction of vehicle depreciation factor and present value and the generation of product(s) based on the predicted vehicle depreciation factor and present value. The flow diagram 600 may be implemented by a system, for example, the vehicle depreciation prediction system 100 of FIG. 1. It may be understood that the features associated with the illustrated blocks may be performed or executed by one or more computing devices and/or processing circuitry contained therein and further may be understood that the blocks are not limited to any specific order and/or may be executed simultaneously or near simultaneously.

At block 602, customer transaction data may be received. As set forth above, the customer transaction data may include expenses derived from a customer's monthly card statement. Thereafter, it may be determined which of the expenses are fuel expenses based on an analysis of the expenses, such as analyzing the MCC of each expense, analyzing textual descriptors of the expenses, and even analyzing patterns or trends in the spending habit of the customer (e.g., the customer purchases every Friday morning).

At block 604, various information about the customer's vehicle may be determined, such as the make, model, and year of the vehicle, fuel consumption information (e.g., city MPG, highway MPG, average MPG), and cost corresponding to each identified fuel expense (e.g., cost per gallon at a particular gas station on the particular day of fuel purchase).

At block 606, using the information obtain at block 604, a predicted number of miles driven on the vehicle may be determined. In some examples, as described above, if the available or identifiable fuel expense information in the card statements is limited for the customer, the predicted number of miles driven determined at block 606 may be projected out to a predefined period of time, such as a year or several years.

At block 608, based on the predicted miles driven on the vehicle determined at block 606, a depreciation factor associated with the vehicle may be determined. In examples, the depreciation factor may be expressed as depreciation per driven mile (e.g., $0.25 per mile). As described above, a machine learning model may continually adjust in real-time or near real-time the calculated depreciation factor based on real-world data (e.g., based on an actual sale of the vehicle and comparing the actual sale value to the predicted values).

At block 610, a present value of the vehicle may be predicted based on the depreciation factor determined or calculated at block 608. The present predicted value of the vehicle may be compared against predefined or predetermined threshold values such that a determination can be made as to whether one or more auto financing products should be generated and provided to the customer.

Figure 7:
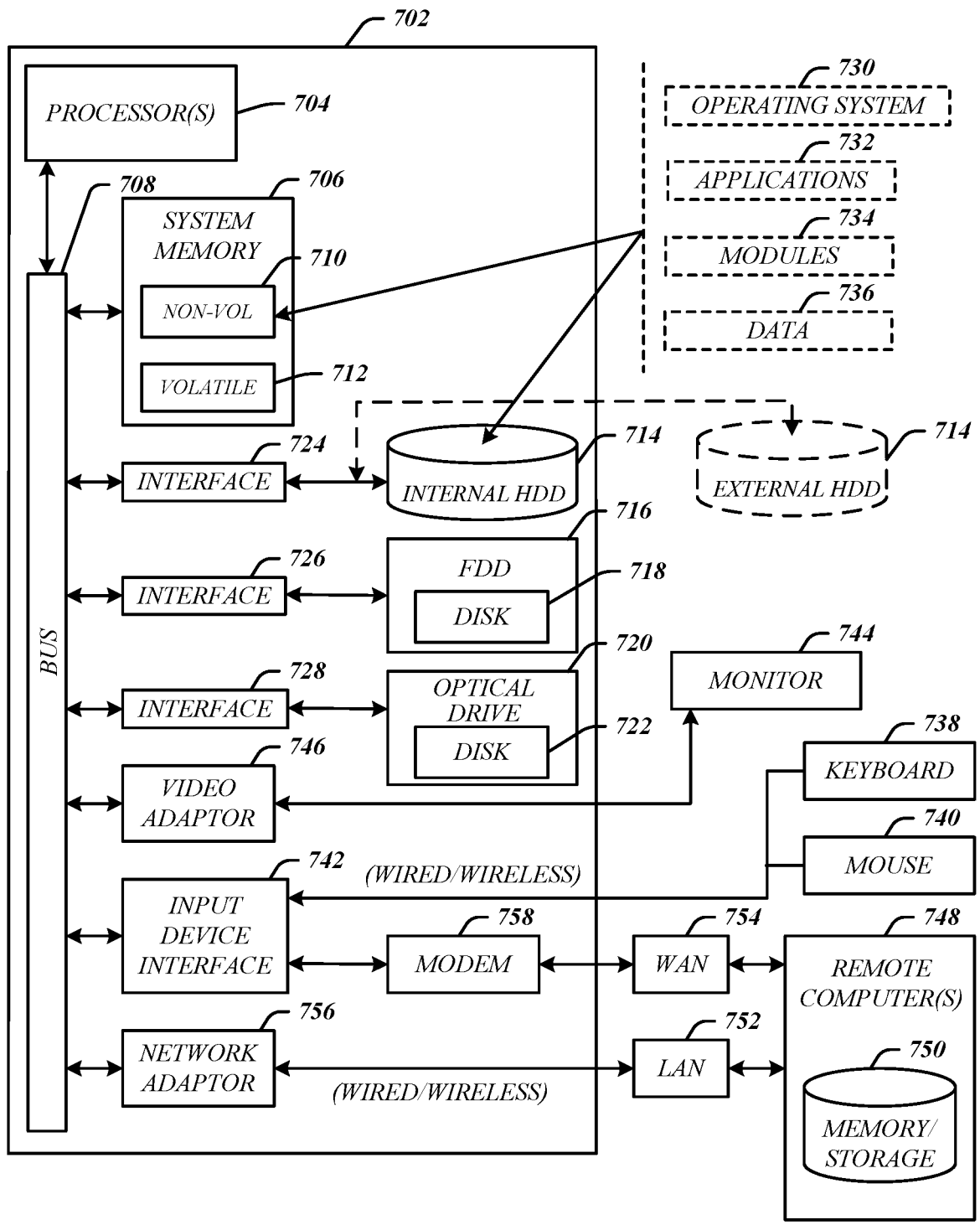
FIG. 7 illustrates an example computing architecture of a computing device in accordance with one or more embodiments.

FIG. 7 illustrates an example computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, the computing device and/or the processing circuitries thereof may be configured to at least execute, support, provide, and/or access the various features and functionalities of the vehicle depreciation prediction system 100 (e.g., the customer identification engine, the filter engine, the vehicle information engine, the machine learning component with the depreciation calculation engine and the distance calculation engine, the product engine etc.). In addition to the system, it may be understood that the computing device and/or the processing circuitries may also be configured to perform, support, or execute any of the features, functionalities, descriptions described anywhere herein.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
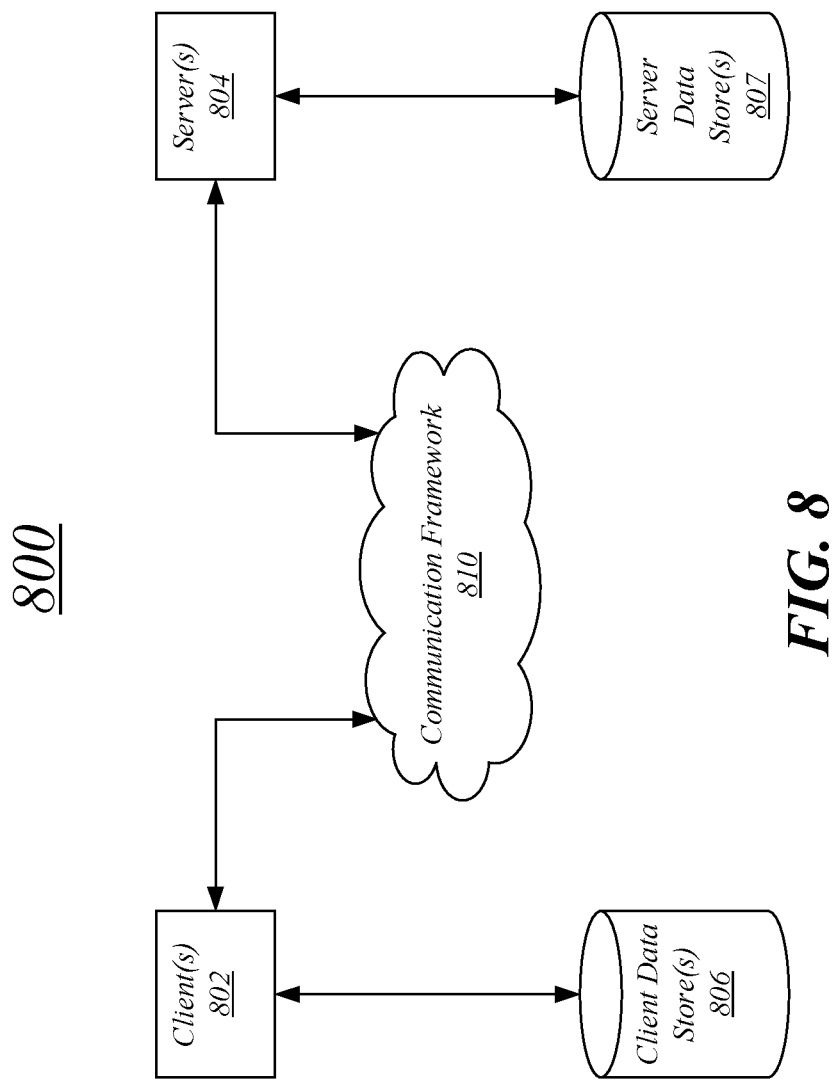
FIG. 8 illustrates an example communications architecture in accordance with one or more embodiments.

FIG. 8 is a block diagram depicting an example communications architecture 800 suitable for implementing various embodiments. For example, one or more computing devices may communicate with each other via a communications framework, such as a network. At least one computing devices connected to the network may be a user computing device, such as a desktop computer, laptop, tablet computer, smartphone, etc. The user, for example, may be a customer or the like. At least a second computing device connected to the network may be one or more server computers, which may be implemented as a back-end server or a cloud-computing server. For example, the vehicle depreciation prediction system may be provisioned on one or more of the back-end server computers. In examples, the user computing device (e.g., customer device) may receive the auto financing products from the product engine of the system via the communications framework.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system comprising:
   one or more processors operable to execute stored instructions that, when executed, cause the one or more processors to:
   train a machine learning model based at least in part on customer transaction data, third party data from one or more third party sources, and real-world data, wherein the customer transaction data includes at least card-based transactions, the third party data includes at least information related to a plurality of vehicles, and the real-world data includes at least information related to real transactional events associated with the plurality of vehicles, the machine learning model dynamically adjusting depreciation or present value calculations based at least in part on the information related to the real transaction events of the real-world data by at least comparing actual sale prices to previously predicted values of the plurality of vehicles determined by the machine learning model;
   receive or access the customer transaction data associated with a card belonging to a customer, the customer transaction data including a plurality of expenses;
   determine which of the plurality of expenses are fuel expenses based on an analysis of the customer transaction data;
   determine at least a make, model, and year of a vehicle associated with the customer;
   determine fuel consumption information for the make, the model, and the year of the vehicle;
   determine a cost corresponding to each determined fuel expense;
   determine a predicted number of miles driven on the vehicle based at least in part on: (i) the fuel expenses, (ii) the cost corresponding to each fuel expense, and (iii) the fuel consumption information for the vehicle;
   determine, via the trained machine learning model, a depreciation factor associated with the vehicle based on the predicted number of miles driven on the vehicle;
   determine, via the trained machine learning model, a present value of the vehicle based at least in part on the determined depreciation factor;
   determine whether the present value of the vehicle falls below a predefined threshold value;
   generate one or more auto financing products in response to the determination that the present value falls below the predefined threshold value; and
   provide the one or more auto financing products to the customer via one or more channels.

2. The system of claim 1, wherein the one or more auto financing products comprise a new loan offer, a refinancing offer, a trade-in offer.

3. The system of claim 1, wherein the fuel consumption information comprises a city miles per gallon (MPG) value associated with a city environment and a highway MPG value associated with a highway environment and wherein the one or more processors is further caused to average the city MPG value and highway MPG value to obtain an average MPG associated with the vehicle.

4. The system of claim 1, wherein the determination of which of the plurality of expenses in the customer transaction data are fuel expenses comprises the one or more processors being further caused to analyze each of the plurality of expenses based on a merchant category code (MCC) and identify an expense as a fuel expense if the analyzed MCC corresponds to a fuel station MCC or a fuel-related MCC.

5. The system of claim 1, wherein the determination of which of the plurality of expenses in the customer transaction data are fuel expenses comprises the one or more processors being further caused to analyze each of the plurality of expenses based on textual descriptors and identify an expense as a fuel expense if the analyzed textual descriptors indicate that the fuel expense is related to a fuel station or fuel.

6. The system of claim 1, wherein the determination of which of the plurality of expenses in the customer transaction data are fuel expenses comprises the one or more processors being further caused to analyze a pattern or a trend in the plurality of expenses and identify an expense as a fuel expense based on the analyzed pattern or the analyzed trend in the plurality of expenses.

7. The system of claim 1, wherein the plurality of expenses is derived from a monthly card statement associated with the card and the predicted number of miles driven corresponds to a time period associated with the monthly card statement.

8. The system of claim 7, wherein the one or more processors is further caused to determine a total number of miles driven on the vehicle in a year by projecting out the predicted number of miles driven.

9. The system of claim 1, wherein the machine learning model is a classification model, a linear regression model, a logistic regression model, a decision tree model, a support vector machine (SVM) model, a Naive Bayes model, a k-nearest neighbors (kNN) model, k-means model, a random forest model, a dimensionality reduction algorithm, a gradient boosting algorithm, an XGBoost algorithm, a LightGBM algorithm, or a Catboost model.

10. The system of claim 1, wherein the one or more processors is further caused to receive real-world data related to the vehicle and cause the machine learning model to learn or adjust the depreciation factor of the vehicle based on the real-world data.

11. A method comprising:
    training a machine learning model based at least in part on customer transaction data, third party data from one or more third party sources, and real-world data, wherein the customer transaction data includes at least card-based transactions, the third party data includes at least information related to a plurality of vehicles, and the real-world data includes at least information related to real transactional events associated with the plurality of vehicles, the machine learning model dynamically adjusting depreciation or present value calculations based at least in part on the information related to the real transaction events of the real-world data including actual sale prices for previously predicted values of the plurality of vehicles determined by the machine-learning model;

receiving or accessing the customer transaction data associated with a card belonging to a customer, the customer transaction data including a plurality of expenses;

determining, via one or more processors, which of the plurality of expenses are fuel expenses based on an analysis of the customer transaction data;

determining at least a make, model, and year of a vehicle associated with the customer;

determining fuel consumption information for the make, the model, and the year of the vehicle;

determining a cost corresponding to each fuel expense;

determining, via the one or more processors, a predicted number of miles driven on the vehicle based at least in part on: (i) the fuel expenses, (ii) the cost corresponding to each fuel expense, and (iii) the fuel consumption information for the vehicle;

determining, via the trained machine learning model, a depreciation factor associated with the vehicle based on the predicted number of miles driven on the vehicle;

determining, via the trained machine learning model, a present value of the vehicle based at least in part on the determined depreciation factor;

determining, via the one or more processors, whether the present value of the vehicle falls below a predefined threshold value;

generating one or more auto financing products based on the determination that the present value falls below the predefined threshold value; and providing the one or more auto financing products to the customer via one or more channels.

12. The method of claim 11, wherein the one or more auto-financing products comprising a new loan offer, a refinancing offer, a trade-in offer or a combination thereof.

13. The method of claim 12, further comprising:
providing the one or more auto-financing with an offer for financing a new vehicle.

14. The method of claim 11, wherein the customer is both a card customer and an auto financing customer.

15. The method of claim 11, further comprising:
receiving real-world data related to the vehicle; and
causing the machine learning model to learn or adjust the depreciation factor of the vehicle based on the real-world data.

16. A non-transitory computer-readable storage medium storing computer-readable program code executable by at least one processor to:
train a machine learning model based at least in part on customer transaction data, third party data from one or more third party sources, and real-world data, wherein the customer transaction data includes at least card-based transactions, the third party data includes at least information related to a plurality of vehicles, and the real-world data includes at least information related to real transactional events associated with the plurality of vehicles, the machine learning model dynamically adjusting depreciation or present value calculations based at least in part on the information related to the real transaction events of the real-world data by at least comparing actual sale prices to corresponding previously predicted values of the plurality of vehicles determined by the machine-learning model;

receive or access the customer transaction data associated with a card belonging to a customer, the customer transaction data including a plurality of expenses;

determine which of the plurality of expenses are fuel expenses based on an analysis of the customer transaction data;

determine at least a make, model, and year of a vehicle associated with the customer;

determine fuel consumption information for the make, the model, and the year of the vehicle;

determine a cost corresponding to each determined fuel expense;

determine a predicted number of miles driven on the vehicle based at least in part on: (i) the fuel expenses, (ii) the cost corresponding to each fuel expense, and (iii) the fuel consumption information for the vehicle;

determine, via the trained machine learning model, a depreciation factor associated with the vehicle based on the predicted number of miles driven on the vehicle;

determine, via the trained machine learning model, a present value of the vehicle based at least in part on the determined depreciation factor;

determine whether the present value of the vehicle falls below a predefined threshold value;

generate one or more auto financing products based on the determination that the present value falls below the predefined threshold value; and provide the one or more auto financing products to the customer via one or more channels.

17. The non-transitory computer-readable storage medium of claim 16, wherein the one or more auto-financing products comprising a new loan offer, a refinancing offer, a trade-in offer, or a combination thereof.

18. The non-transitory computer-readable storage medium of claim 17, wherein the computer-readable program code further causes the at least one processor to:
providing the one or more auto-financing with an offer for financing a new vehicle.

19. The non-transitory computer-readable storage medium of claim 16, wherein the machine learning model is a classification model, a linear regression model, a logistic regression model, a decision tree model, a support vector machine (SVM) model, a Naive Bayes model, a k-nearest neighbors (kNN) model, k-means model, a random forest model, a dimensionality reduction algorithm, a gradient boosting algorithm, an XGBoost algorithm, a LightGBM algorithm, or a Catboost model.

20. The non-transitory computer-readable storage medium of claim 16, wherein the computer-readable program code further causes the at least one processor to:
receive real-world data related to the vehicle; and
cause the machine learning model to learn or adjust the depreciation factor of the vehicle based on the real-world data.

* * * * *